(12) United States Patent
Kamgar et al.

(10) Patent No.: US 6,549,559 B2
(45) Date of Patent: *Apr. 15, 2003

(54) APPARATUS AND METHOD FOR LOCKING ONTO A PSUEDO-NOISE CODE IN AN IS-95 SPREAD SPECTRUM COMMUNICATIONS SYSTEM

(75) Inventors: Farbod Kamgar, Campbell, CA (US); Mariam Motamed, San Francisco, CA (US); Antoine Jean Rouphael, Tracy, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 08/996,669

(22) Filed: Dec. 23, 1997

(65) Prior Publication Data

US 2002/0057729 A1 May 16, 2002

(51) Int. Cl.[7] ................................................. H04B 1/69
(52) U.S. Cl. ........................ 375/134; 375/137; 375/142; 375/150
(58) Field of Search .............................. 375/206, 208, 375/209, 148, 149, 133, 134, 136, 137, 142, 150, 367; 370/342, 320

(56) References Cited

U.S. PATENT DOCUMENTS

| | | | | |
|---|---|---|---|---|
| 5,347,536 A | * | 9/1994 | Meehan | 375/148 |
| 5,390,207 A | * | 2/1995 | Fenton et al. | 375/209 |
| 5,640,416 A | * | 6/1997 | Chahmers | 375/206 |
| 5,729,571 A | * | 3/1998 | Park et al. | 375/206 |
| 5,852,630 A | * | 12/1998 | Langberg et al. | 375/219 |
| 5,953,367 A | * | 9/1999 | Zhodzicshsky et al. | 375/140 |
| 5,966,403 A | * | 10/1999 | Pon | 375/208 |
| 6,163,567 A | * | 12/2000 | Hatch | 375/149 |

FOREIGN PATENT DOCUMENTS

GB        2313750 A        12/1997

OTHER PUBLICATIONS

"Decision–Directed Coherent Delay–Lock Tracking Loop for DS–Spread–Spectrum Signals", IEEE Trans. on Communications, vol. 39, No. 5, May 1991, pp. 758–765.

* cited by examiner

Primary Examiner—Shuwang Liu
(74) Attorney, Agent, or Firm—John Vodopia

(57) ABSTRACT

In response to an error signal, a pseudo-noise generator (312 or 416) generates an on-time pseudo-noise signal, an early pseudo-noise signal delayed by less than one-half of a chip interval, and a late pseudo-noise signal advanced by less than one-half of a chip interval. A correlator (302 and 304, or 404) correlates a received signal with the early and late pseudo-noise signals to generate the error signal. The combination of the pseudo-noise generator (312 or 416) and the correlator (302 and 304, or 404) creates a loop in which the on-time pseudo-noise signal tracks a received pseudo-noise code more closely than in prior art devices and enables a deinterleave and decode device (210) within the receiver to demodulate the received signal more effectively.

3 Claims, 7 Drawing Sheets

(EARLY)

(LATE)

(EARLY-LATE)

(EARLY)

(LATE)

(EARLY-LATE)

APPARATUS AND METHOD FOR LOCKING ONTO A PSUEDO-NOISE CODE IN AN IS-95 SPREAD SPECTRUM COMMUNICATIONS SYSTEM

BACKGROUND OF THE INVENTION

1. Field of the Invention

The present invention relates generally to an apparatus and method for communicating using spread spectrum techniques, and more particularly for an apparatus and method of locking onto a pseudo-noise code in an IS-95 spread spectrum communications system.

2. Discussion of Background Art

Spread-spectrum communication systems currently find widespread use in modern cellular communications devices. Spread spectrum systems allow more users to transmit and receive communications in an ever tighter bandwidth environment.

One technique for spreading a baseband signal so as to fill an entire channel bandwidth is to mix the baseband signal with a Walsh code and a complex pseudo-noise (PN) spreading signal. The Walsh code and PN spreading signal effectively encode the baseband signal by modulating (i.e. chopping) each data symbol within the baseband signal into a number of chips having a chip period (i.e. chip interval) $T_C$, as is discussed further by Charles E. Cook and Howard S. Marsh, "An Introduction to Spread Spectrum," IEEE Communications Magazine, March 1983, and by David P. Whipple, "The CDMA Standard", Applied Microwave & Wireless, Winter 1994, pp. 24–39 (originally published as, "North American Cellular CDMA", Hewlett-Packard Journal, December 1993, pp. 90–97). The complex PN code is given by the following equation: $PN(t)=PN_I(t-\delta)+jPN_J(t-\delta)$, where $\delta$ is a phase offset. Each transmitter within a CDMA network broadcasting over the same frequency spectrum and within a distance of a particular receiver is distinguishable by its unique phase offset, $\delta$. Each of the transmitters include a number of channels which are encoded and distinguished by different Walsh codes.

Current spread spectrum receivers acquire many different transmitted signals, which, while appearing to be superimposed on one another, are demodulated by correlators that are tuned to accept only transmitted channels corresponding to a particular PN code phase offset and a particular Walsh code. The receiver accomplishes this by stripping away the carrier signal and demodulating the spread spectrum signals with correlators having a matching PN code phase offset and Walsh code.

In order for demodulation to occur successfully, the transmitter's and receiver's PN spreading phase offsets must be synchronized. Delay-locked Loops (DLLs) containing correlators are commonly used to synchronize the receiver's PN code phase offset to the transmitter's PN code phase offset. However, the filters within DLLs reduce the orthogonality of the Walsh codes used to encode the baseband data signal. As a result, the baseband data signals are more susceptible to being corrupted by Orthogonal Channel Noise (OCN) and Multiple Access Interference (MAI) noise. High levels of MAI noise also significantly increase a probability that the DLL will lose lock, disrupting communications.

What is needed is an apparatus and method for reducing the effect of noise on delay locked loops within spread spectrum communications systems conforming to the IS-95 standard.

SUMMARY OF THE INVENTION

The present invention is a spread spectrum communication receiver that is compliant with IS-95 standards and incorporates a modified delay locked loop which is more noise tolerant than prior art devices. In response to an error signal, a pseudo-noise generator within the circuit of the present invention generates, an on-time/punctual pseudo-noise signal, an early pseudo-noise signal delayed by less than one-half of a chip interval, and a late pseudo-noise signal advanced by less than one-half of a chip interval. A correlator mixes and integrates a received signal with the early and late pseudo-noise signals to generate the error signal. The combination of the pseudo-noise generator and the correlator create a loop in which the on-time pseudo-noise signal tracks a received pseudo-noise code more closely and enables a deinterleave and decode device within the receiver to demodulate the received signal more effectively.

The method of the present invention includes the steps of generating an on-time pseudo-noise signal, an early pseudo-noise signal delayed by less than one-half of a chip interval, and a late pseudo-noise signal advanced by less than one-half of a chip interval, in response to an error signal, and then correlating a received signal with the early and late pseudo-noise signals to generate the error signal, thereby completing a delay-locked loop circuit for tracking a received pseudo-noise code.

These and other aspects of the invention will be recognized by those skilled in the art upon review of the detailed description, drawings, and claims set forth below.

DETAILED DESCRIPTION OF THE PREFERRED EMBODIMENT

Figure 1:
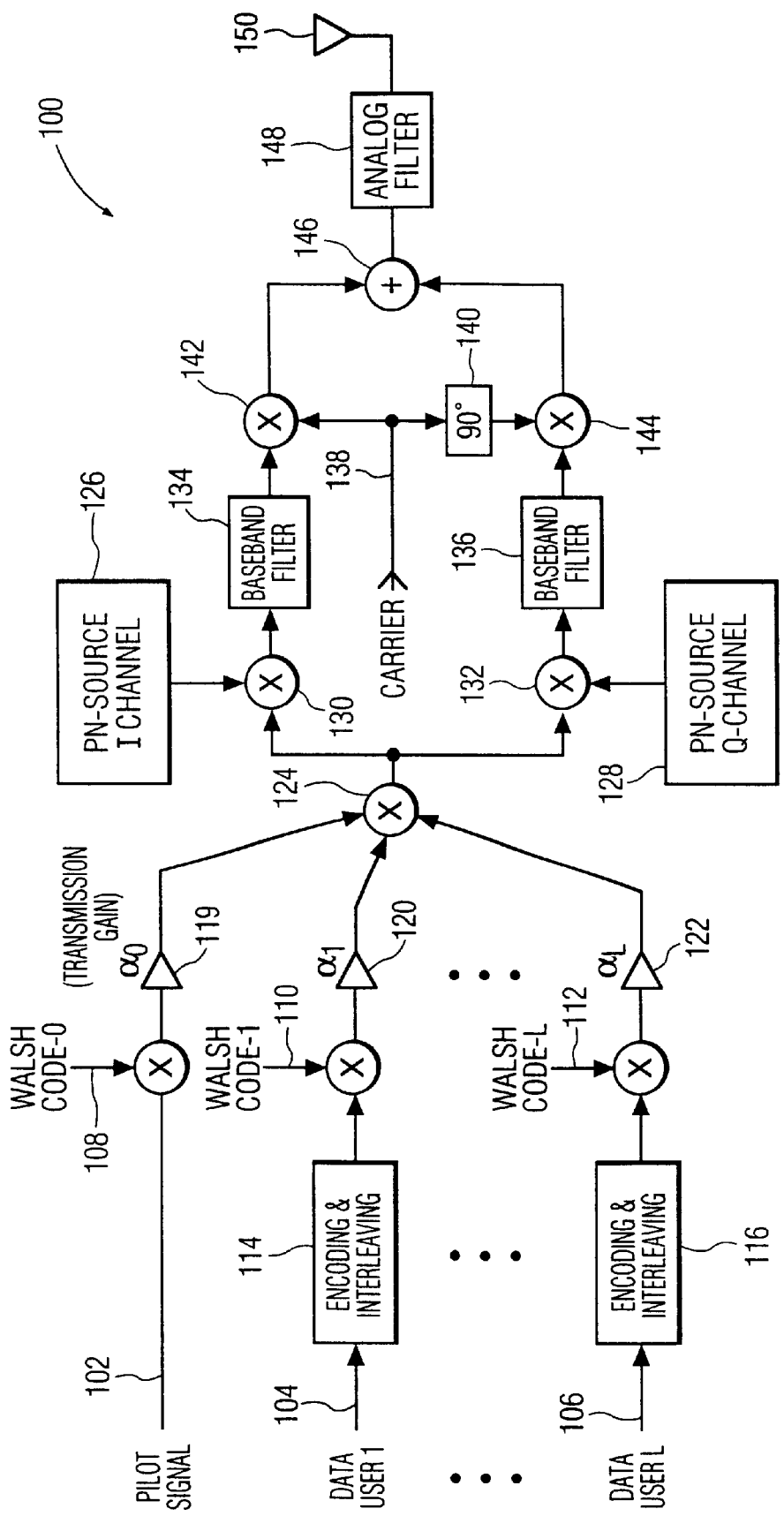
FIG. 1 is a block diagram of a portion of a CDMA spread spectrum transmitter.

FIG. 1 is a block diagram of a portion of a CDMA spread spectrum transmitter 100. The transmitter 100 includes a pilot signal on line 102, a user-1 data signal on line 104, a user-L data signal on line 106, where 'L' is an integer number, Walsh code-0 on line 108, mixer 109, Walsh code-1 on line 110, mixer 111, Walsh code-L on line 112, mixer 113, encoding & interleaving device 114, encoding & interleaving device 116, amplifier 119, amplifier 120, amplifier 122, adder 124, an I-Channel Pseudo-Noise (PN) source 126, a Q-Channel PN source 128, mixer 130, mixer 132, baseband filter 134, baseband filter 136, a carrier signal on line 138, phase shifter 140, mixer 142, mixer 144, adder 146, analog filter 148, and antenna 150. The pilot signal is unmodulated and consists of only quadrature PN codes. The pilot signal on line 102 functions as a reference signal for use by a spread spectrum receiver (see FIG. 2). The power of the pilot signal is set higher than all other signals in order to facilitate receiver synchronization and signal tracking.

The encoding & interleaving devices 114 through 116 receive data signals on lines 104 through 106 respectively. The data signals are typically made up of discrete binary data bits in accordance with IS-95 standards. The encoding & interleaving devices 114 through 116 also receive and interleave various other signals, such as sync signals, paging signals, and traffic signals, which are generated by other circuitry (not shown) within the transmitter 100. All of these signals are known by those skilled in the art. The encoding & interleaving devices 114 through 116 assign the data signals to be transmitted to either a paging signal or a traffic signal.

Mixers 109 through 113 are coupled to receive Walsh codes on lines 108, through 112 and various pilot and data signals on line 102 and from the encoding and interleaving devices 114 through 116, respectively. A different orthogonal Walsh code (i.e. Walsh code-0, Walsh code-1, through Walsh code-L), is mixed with each of these signals, uniquely spreading each of their bandwidths and defining a different channel. The Walsh codes are preferably generated by a linear shift register that produces Walsh codes having a typical period of 64 chip intervals. Orthogonal codes are defined as codes with zero cross-correlation and an autocorrelation of one. Amplifiers 118 through 120 are coupled to mixers 109 through 113 respectively and adjust the gain of each of the Walsh encoded channels. Adder 124 is coupled to amplifiers 118 through 120 and combines each of the Walsh encoded channels.

PN source 126 generates a $PN_I(t-\delta)$ component of a complex PN code and PN source 128 generates a $PN_J(t-\delta)$ component of the complex PN code. The complex PN code is denoted by the expression $PN(t)=PN_I(t-\delta)+jPN_J(t-\delta)$, where $\delta$ is a phase offset. The phase offset uniquely distinguishes the transmitter 100 from other transmitters (not shown). The PN code is generated by a linear shift register with a period of $2^{15}$ chip intervals. The resulting PN signal generated by the PN sources 126 and 128 has a 1.228 Mbps rate.

Mixers 130 and 132 are coupled to respectively receive and mix the PN signals from the PN sources 126 and 128 and the combined signal from adder 124, as shown in FIG. 1. Thus mixers 130 and 132 further encode the data symbols.

Baseband filters 134 and 136 receive and shape the spread spectrum signals from mixers 130 and 132, respectively. Baseband filters 134 and 136 typically have 1.25 MHz bandwidths. However, by passing the spread spectrum signals through filters 134 and 136, some of the spread spectrum signal's orthogonality is sacrificed.

Mixer 142 is connected to baseband filter 134 and line 138, mixing the carrier signal on line 138 with the output of baseband filter 134. Mixer 144 is coupled to baseband filter 136 and receives a 90° phase shifted carrier signal from the phase shifter 140. Adder 146 adds output signals from mixers 142 and 144, forming a combined signal, and the analog filter 148 filters the combined signal from adder 146. The antenna 112 transmits the filtered spread spectrum signal as a quadraphase PN modulated signal.

Figure 2:
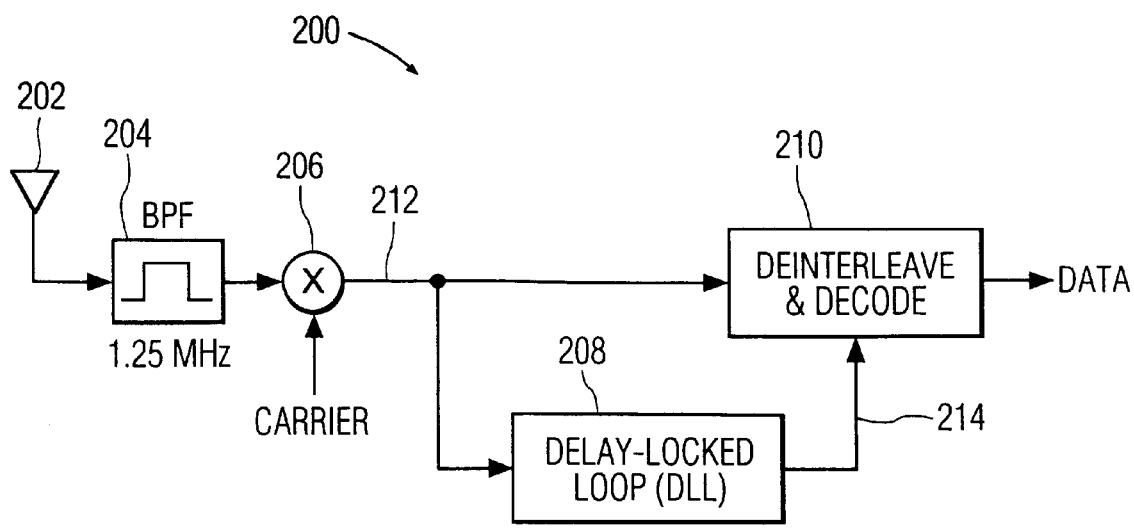
FIG. 2 is a block diagram of a portion of a CDMA spread spectrum receiver.

FIG. 2 is a block diagram of a portion of a spread spectrum receiver 200. The receiver 200 includes an antenna 202, a band pass filter 204, mixer 206, a Delay-Locked Loop (DLL) 208, and a deinterleave & decode device 210. The receiver 200 further includes other conventional circuitry which is not shown. The antenna 202 receives the spread spectrum signal transmitted by the transmitter 100. The band pass filter 204 filters the signal from the antenna 202. The mixer 206 receives signal output from the band pass filter 204 and a carrier signal generated by conventional circuitry (not shown). The receiver's 200 carrier signal is at the same frequency as the carrier on line 138 mixed by the transmitter 100. Mixer 206 mixes the filtered signal with the carrier, thus stripping the carrier from the spread spectrum signal. The DLL 208 and the deinterleave & decode device 210 are coupled to the mixer 206 through signal line 212.

The DLL 208 locks on to the PN code signal generated at the transmitter 100 in a process called "code tracking." Delay-locked code tracking loops can be classified as either coherent or non-coherent. The present invention uses a coherent tracking loop which makes use of the received carrier frequency and phase information so that the DLL 208 locks onto the received signal. The received signal is synchronized with a PN code generated within the DLL 208. Preferably the received signal is synchronized to within a half of a chip interval. The DLL achieves this time alignment by correlating the received signal with early and late locally generated PN codes to create an error signal. The error signal is then used in a feedback loop to adjust a PN code that is generated internally by the receiver 200. When the receiver-generated PN code is equal to the PN code transmitted by the transmitter 100, then the error signal is equal to zero, and the DLL is said to be "locked-on" to the received signal. A complete tracking range of the error signal, when plotted, is commonly called an "S-curve."

The deinterleave & decode device 210 receives the spread spectrum signal over line 212 and the PN code signal on line 214. Using the pilot signal transmitted by the transmitter 100 as a coherent carrier reference, the deinterleave & decode device 210 further demodulates the received data signals into baseband data signals. This demodulation process includes removing the Walsh coding from the data signals. As a result, the pilot signal, the sync signals, the paging signals, the traffic signals and various other user data signals originally transmitted by the transmitter 100 are decoded and separated out.

Those skilled in the art will recognize that in a typical spread spectrum system, various other devices such as an input keyboard, a processing unit, an internal memory device, and an output display are also included within the transmitter 100 and receiver 200. The internal memory device typically stores computer program instructions for controlling how the processing unit accesses, transforms and outputs signals which control the functions of the transmitter 100 and the receiver 200. The internal memory can be supplemented with other computer useable storage media, including a compact disk, a magnetic drive or a dynamic random access memory.

Figure 3:
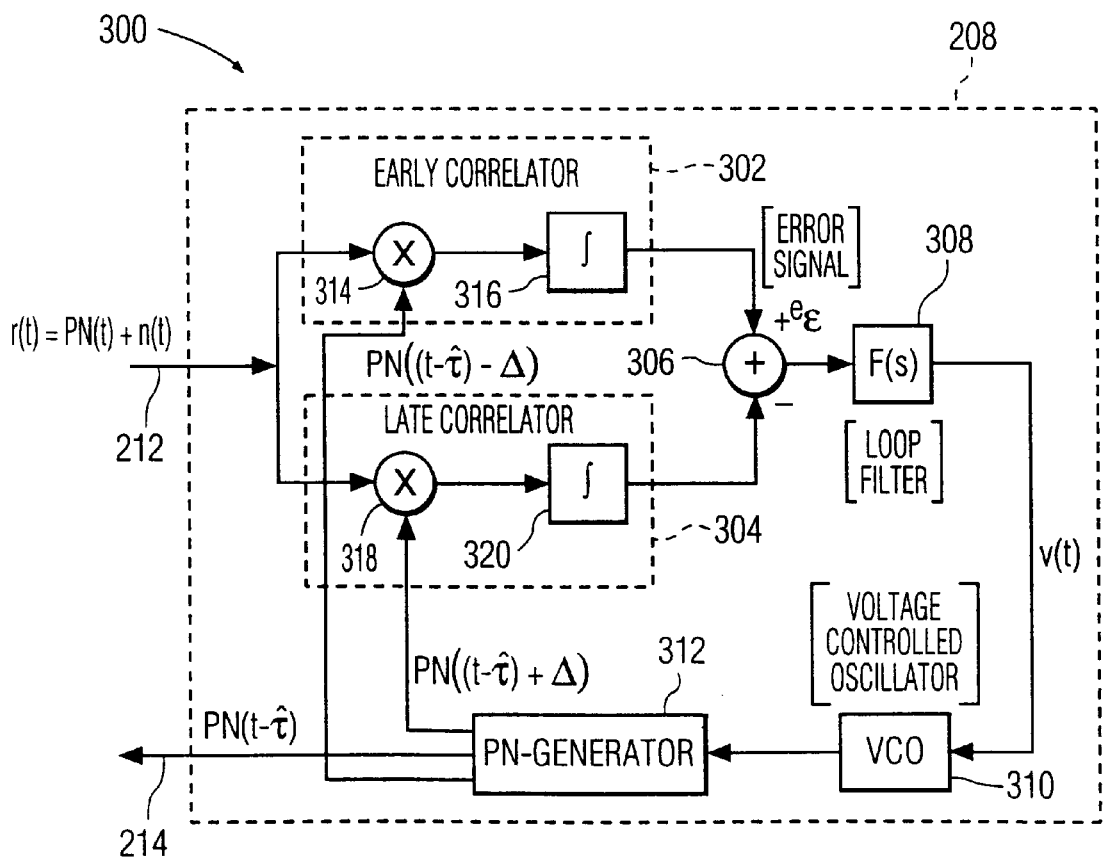
FIG. 3 is a block diagram of a Delay-Locked Loop (DLL) in the spread spectrum receiver.

FIG. 3 is a block diagram of a DLL 208 in the spread spectrum receiver 200. The DLL 208 includes an early correlator 302, a late correlator 304, adder 306, a loop filter 308, a Voltage Controlled Oscillator (VCO) 310 and a PN generator 312. While the terms "early" and "late" are used to label the correlators, the present invention actually operates in accordance with the mathematical equations discussed below, which take precedence. The early correlator 302 includes mixer 314 and correlator 316. The late correlator 304 includes mixer 318 and correlator 320. The early correlator 302 in the DLL 208 receives the PN encoded spread spectrum signal on line 212 and a delayed PN code from the PN generator 312. The late correlator 304 receives the PN encoded spread spectrum signal on line 212 and an advanced PN code from the PN generator 312. The late signal output is then subtracted from the early signal output by the adder 306 to produce an error signal. The loop filter 308 receives the error signal from the adder 306. The filtered error signal is then sent to the VCO 310. The VCO 310 generates a signal from the filtered error signal which is received by the PN generator 312. The VCO 310 adjusts the timing of the PN generator 312. In response to the error signal, the PN generator 312 fine tunes an on-time PN code signal on line 214, and the delayed and advanced PN code signals are sent to the early and late correlators 302 and 304 respectively. The on-time PN code signal on line 214 is sent to the deinterleave & decode device 210 for use in processing out the baseband data from the spread spectrum signal in a manner in which is conventionally known.

A more mathematical discussion of the DLL's 208 operation now follows. The spread spectrum signal, r(t), received by both the early and late correlators 302 and 304 on line 212 consists of a PN code, PN(t–$\hat{\tau}$), generated by the transmitter 100 and channel noise, n(t), added during transmission of the signal from the transmitter's 100 antenna 112 and the receiver's 200 antenna 202, where $\hat{\tau}$ denotes the unknown transmission delay, as shown in Equation (1).

$$r(t)=PN(t-\hat{\tau})+n(t) \qquad \text{Eq. (1)}$$

The channel noise component includes OCN, Multiple Access Interference (MAI) noise and White Gaussian Noise (WGN).

It can be shown that a maximum likelihood estimate of the transmission delay $\hat{\tau}$ satisfies the equation:

$$\int_{-T/2}^{T/2} r(t)\partial PN(t-\hat{\tau})/\partial t\, dt = 0 \qquad \text{Eq. (2)}$$

where T is the period of the PN code. The maximum likelihood estimate is conventionally known in the art and is discussed in Jack K. Holmes, *Coherent Spread Spectrum Systems*, Wiley 1982 and in John G. Proakis, *Digital Communications*, 2$^{nd}$ edition, McGraw-Hill 1989. In other words, Equation (2) shows that the optimum estimate of the transmission delay is obtained by correlating the received signal with the time derivative of the PN code generated by the DLL's 208 PN generator 312. The DLL's 208 delay lock tracking loop circuit then drives the correlation to zero.

In practical implementations, a discrete approximation, such as a first order difference, is used for the derivative in Equation (2). More specifically, an estimate of the correlation of the time difference between the received signal and of the locally generated PN code is obtained by first multiplying, using multiplier 314, the received signal with the PN code which has been delayed a fraction of a chip interval, PN((t–$\hat{\tau}$)–$\Delta$), and then integrating the result with integrator 316 so as to create a first intermediate result. The received signal is also multiplied, using multiplier 318, with a PN code from the PN generator 312 that has been advanced a fraction of a chip interval, PN((t–$\hat{\tau}$)+$\Delta$), and then integrating the result with integrator 320 so as to create a second intermediate result. The symbol $\Delta$ refers to the fraction of a chip interval by which the PN code, generated by the receiver 200, is either delayed or advanced. Typically $\Delta$ is set equal to one-half of a chip interval (i.e. Tc/2); however, as is discussed below, the present invention teaches setting $\Delta$ to less than one-half of a chip interval.

The second intermediate result is then subtracted from the first intermediate result by the adder 306 so as to generate the error signal (e). This process is referred to as early-late correlation. The error signal is passed through the loop filter 308 with the LaPlace-transform F(s) that generates a control voltage v(t) for the VCO 310 and fine tunes the PN generator.

With the input signal, r(t), as defined above, the error signal, e, can be written as:

$$e=[R_{PN}(t-\hat{\tau}-\Delta)-R_{PN}(t-\hat{\tau}+\Delta)]+n_{e-1}(t) \qquad \text{Eq. (3)}$$

where, $R_{PN}(.)$ denotes the autocorrelation of the PN sequence, and $n_{e-1}(.)$ is the noise out of the early and late correlators 302 and 304. The term in brackets in Equation (3) is known as a control signal (and when plotted, as an S-curve). The control signal is written as:

$$S(\epsilon)=[R_{PN}(\epsilon-\Delta)-R_{PN}(\epsilon+\Delta)] \qquad \text{Eq. (4)}$$

where $\epsilon=t-\hat{\tau}$ is called a code tracking error.

Equation (3) can also be rewritten as:

$$e=\int r(t)PN(t-\hat{\tau}-\Delta)-\int r(t)PN(t-\hat{\tau}+\Delta)+n_{e-1}(t) \qquad \text{Eq. (5)}$$

By examining the equations above, the operation of the DLL 208 in performing these mathematical functions is as follows: The early correlator 302 implements the first part of Equation (5) by using the first multiplier 314 to multiply r(t) by PN(t–$\hat{\tau}$–$\Delta$), and integrator 316 integrates the multiplied expression over a chip interval. The late correlator 304 implements the second part of Equation (5) by using multiplier 318 to multiply r(t) by PN(t–$\hat{\tau}$+$\Delta$), and integrator 320 integrates the multiplied expression over the same chip interval. Adder 306 then subtracts the late correlator's 304 result from the early correlator's 302 result to yield the error signal. This is known as a discrete time integrate and dump process.

Figure 4:
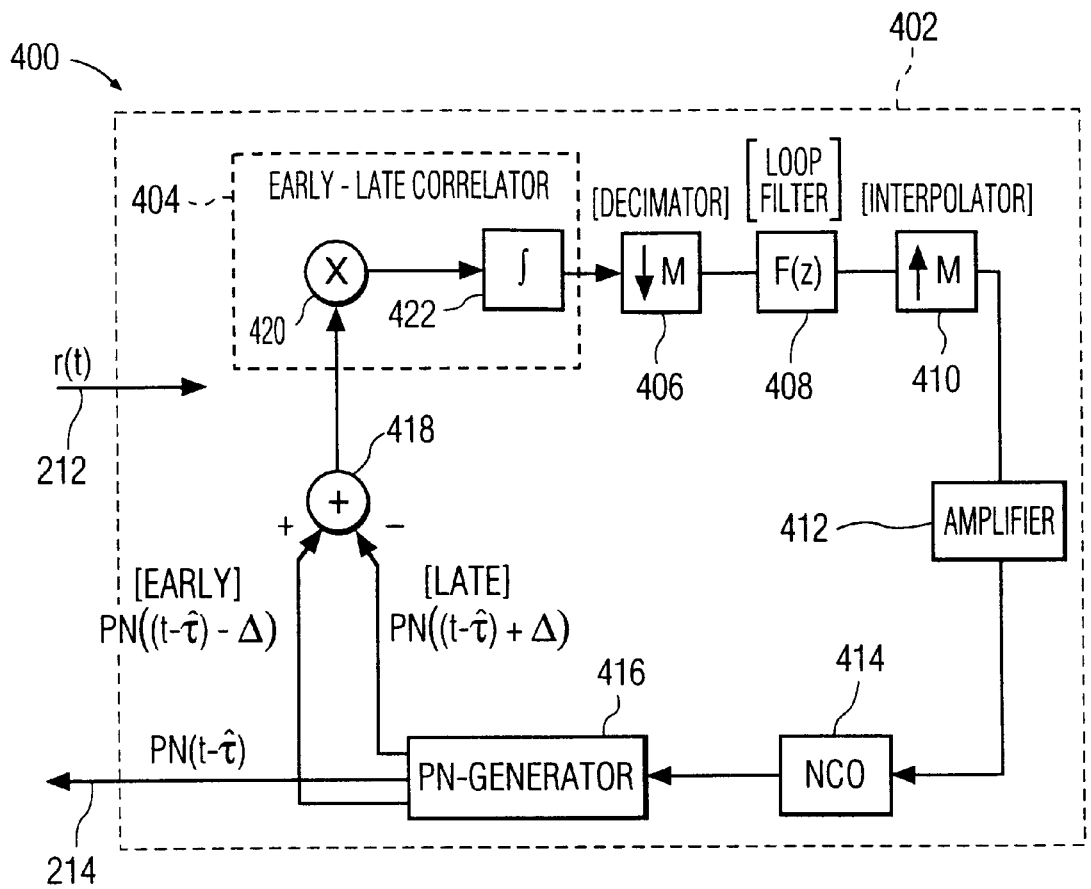
FIG. 4 is a block diagram of an alternate DLL for the spread spectrum receiver.

FIG. 4 is a block diagram of an alternate DLL 402 for the spread spectrum receiver 200. The alternate DLL 402 includes an early-late correlator 404, a decimator 406, a loop filter 408, an interpolator 410, an amplifier 412, a Numerically Controlled Oscillator (NCO) 514, a pseudo-noise (PN) generator 416, and an adder 418. The early-late correlator 404 includes a multiplier 420 and an integrator 422.

Since Equation (5) is a linear equation, it can be rewritten as:

$$e = \int r(t)[PN(t-\hat{\tau}-\Delta) - PN(t-\hat{\tau}+\Delta)] + n_{e-1}(t) \quad \text{Eq. (6)}$$

FIG. 4 shows that a DLL 402 design based on Equation (6) requires only one correlator. In contrast, FIG. 3 shows that a DLL 208 design based on Equation (5) requires two correlators 302 and 304.

The PN generator 416 generates both a delayed PN code signal PN(t−τ̂−Δ) and an advanced PN code signal PN(t−τ̂+Δ). The adder 418 receives these PN code signals and subtracts the late PN code signal from the early PN code signal. The multiplier 420 receives the incoming spread spectrum signal r(t) and the summed result from the adder 418, and multiplies them together to produce a resulting product. The integrator 422 integrates the resulting product over one chip interval. The decimator 406 receives the signal from the early-late correlator 404 and decimates the signal by the early-late correlator's accumulation length. This accumulation length is equal to a predetermined number of symbols. A symbol is preferably equal to 64 chips, and each chip is defined by a predetermined number of samples. The loop filter 408 is connected to the decimator 406 and has a Z transfer function defined as F(z). The loop filter 408 is able to shape the output of the decimator 406 at a lower rate than would otherwise be possible without the decimator 406. The interpolator 410 receives the output of the loop filter 408 which is then interpolated by the number of accumulation length samples. Decimators and interpolators are conventionally known in the art and are discussed in John G. Proakis, *Digital Communications*, 2$^{nd}$ edition, McGraw-Hill 1989 and in J. G. Proakis & D. G. Manolakis, *Digital Signal Processing Principles, Algorithms, and Applications*, 2$^{nd}$ edition, Macmillan 1992. The NCO 414 is receives the signal from the interpolator 410 and adjusts the timing of the PN generator 416. The PN generator 416 receives the signal from the NCO 414 which updates the PN generator's 416 transmission delay estimate, τ̂, during every accumulation period. The PN generator 416 also outputs the on-time PN code signal on line 214. The DLL 402 experiences a least amount of jitter (i.e. is the most stable) when the accumulation length is on the order of a few chip intervals. Increasing the decimation and interpolation rate is possible, but at the expense of increasing jitter in the DLL 402.

Figure 5:
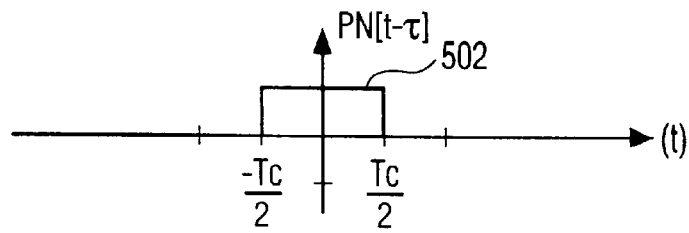
FIG. 5 is a graph of a portion of an on-time pseudo-noise signal generated by a pseudo-noise generator in the DLL.

FIGS. 5 through 8 are graphs of signals sent to the early and late correlators 302 and 304 when Δ is set equal to $T_C/2$. FIG. 5 is a graph of a portion of an on-time PN signal 502 generated by the pseudo-noise generator 416 in the DLL 402. The horizontal axis represents time t and the vertical axis represents an amplitude of the on-time PN signal 502, PN(t−τ̂). The on-time PN signal 502 has neither been delayed nor advanced. The on-time PN signal 502 has a period equal to one chip interval ($T_C$) and is centered about time t=0.

Figure 6:
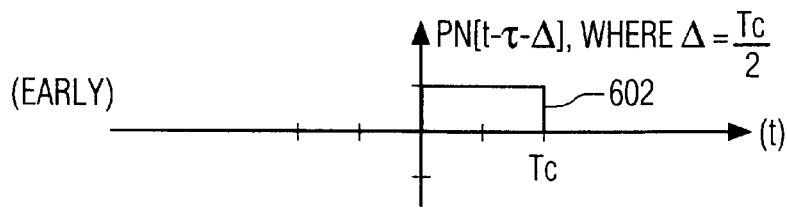
FIG. 6 is a graph of a portion of an early pseudo-noise signal equal to the on-time pseudo-noise signal delayed by a half of a chip interval.

FIG. 6 is a graph of a portion of an early PN signal 602 equal to the on-time PN signal 502 delayed by a half of a chip interval. The horizontal axis represents time t and the vertical axis represents an amplitude of the early PN signal 502, PN(t−τ̂−Δ), where Δ=$T_C/2$. The early PN signal 502 is sent to adder 418.

Figure 7:
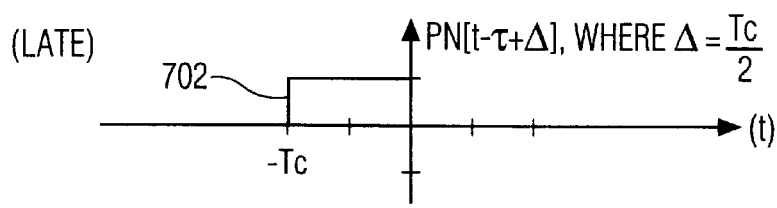
FIG. 7 is a graph of a portion of a late pseudo-noise signal equal to the on-time pseudo-noise signal advanced by a half of a chip interval.

FIG. 7 is a graph of a portion of a late PN signal 702 equal to the on-time PN signal 502 advanced by a half of a chip interval. The horizontal axis represents time t and the vertical axis represents an amplitude of the late PN signal 702, PN(t−τ̂+Δ), where Δ=$T_C/2$. The late PN signal 702 is sent to adder 418.

Figure 8:
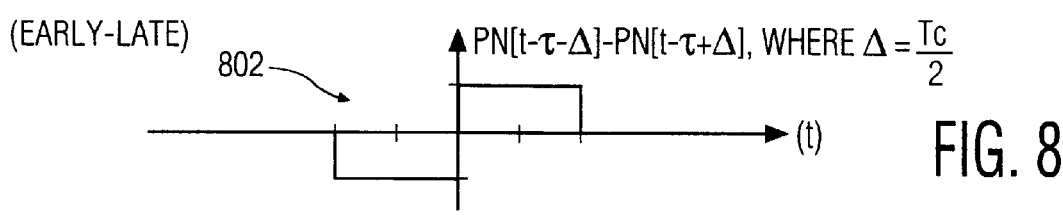
FIG. 8 is a graph of a portion of an early-late PN signal equal to the early pseudo-noise signal minus the late pseudo-noise signal.

FIG. 8 is a graph of a portion of a early-late PN signal 802 equal to the early PN signal 602 minus the late PN signal 702. The horizontal axis represents time t and the vertical axis represents an amplitude of the early-late PN signal 802, PN(t−τ̂−Δ)−PN(t−τ̂+Δ), where Δ=$T_C/2$. Adder 418 subtracts the late PN signal 702 from the early PN signal 602 to produce the early-late PN signal 802.

Figure 9:
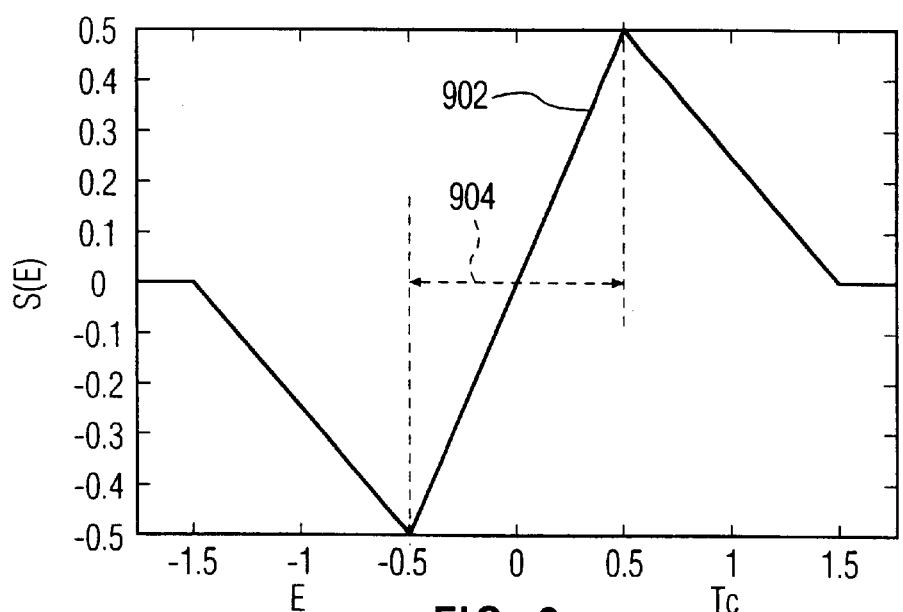
FIG. 9 is a graph of an S-curve tracking range corresponding to a control signal, $S(\epsilon)$, when $\Delta=T_C/2$.

FIG. 9 is a graph of an S-curve tracking range 902 corresponding to the control signal, S(ε), when Δ=$T_C/2$. The S-curve is defined by Equation (4), where ε=t−τ̂ is the code tracking error. The S-curve characteristics and the DLL's performance are a function of a time difference between the delayed and advanced PN codes. As seen from FIG. 9, the S-curve is a non-linear function of the tracking error. The DLLs 208 and 402 are designed to operate in a linear region 904 of the S-curve about S(ε)=0. The function of the DLL circuitry in the DLLs 208 and 203 is to drive the output of the S-curve to zero. When S(ε)=0 the DLLs are said to be in lock.

In general, the dynamics of the tracking error and noise characteristics determine the DLL's largest bandwidth. However, the parameters of the loop filters 308 and 408 are chosen so as to yield a predetermined closed loop bandwidth for the DLL which is less than the DLL's largest bandwidth. In IS-95 applications, typical tracking error dynamics result in a DLL bandwidth which is on the order of a few Hertz. However, a closed loop bandwidth of a few Hertz yields a slower DLL response. In comparison, a larger DLL bandwidth increases the DLL's tracking error. This points to a trade-off between the DLL's response time and the tracking error of the apparatus. A closed DLL bandwidth of about 100 Hz has been found to be the most suitable for IS-95 applications.

Figure 10:
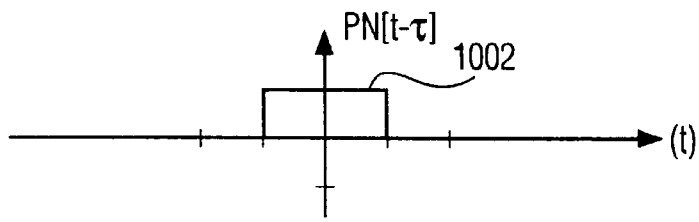
FIG. 10 is a graph of the portion of a second on-time pseudo-noise signal generated by the pseudo-noise generator in the DLL.

FIGS. 10 through 14 are graphs of signals sent to the early-late correlator 402 when Δ<$T_C/2$. FIG. 10 is a graph of a portion of a second on-time pseudo-noise signal 1002 generated by the pseudo-noise generator 416 in the DLL 402. The horizontal axis represents time t and the vertical axis represents an amplitude of the second on-time PN signal 1002, PN(t−τ̂). The second on-time PN signal 1002 has neither been delayed nor advanced and only a portion is shown. The second on-time PN signal 1002 has a period equal to one chip interval ($T_C$) and is centered about time t=0.

Figure 11:
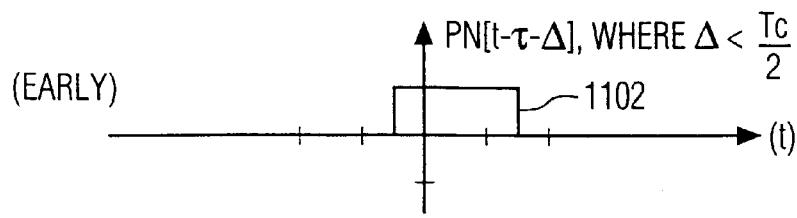
FIG. 11 is a graph of a portion of a second early pseudo-noise signal equal to the second on-time pseudo-noise signal delayed by less than a half of a chip interval.

FIG. 11 is a graph of a portion of a second early pseudo-noise signal 1102 equal to the second on-time pseudo-noise signal 1002 delayed by less than a half of a chip interval. The horizontal axis represents time t and the vertical axis represents an amplitude of the second early PN signal 1102, PN(t−τ̂−Δ), where Δ<$T_C/2$. The second early PN signal 1102 is sent to adder 418.

Figure 12:
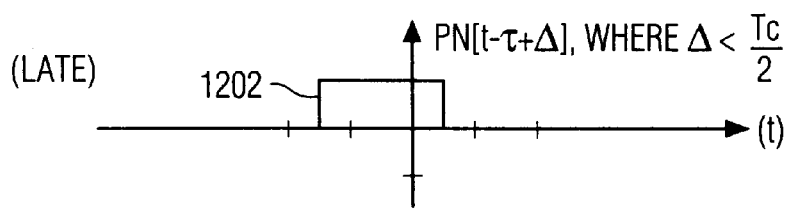
FIG. 12 is a graph of a portion of a second late pseudo-noise signal equal to the second on-time pseudo-noise signal advanced by less than a half of a chip interval.

FIG. 12 is a graph of a portion of a second late pseudo-noise signal 1202 equal to the second on-time pseudo-noise signal 1002 advanced by less than a half of a chip interval. The horizontal axis represents time t and the vertical axis represents an amplitude of the second late PN signal 1202, PN(t−τ̂+Δ), where Δ<$T_C/2$. The second late PN signal 1202 is sent to adder 418.

Figure 13:
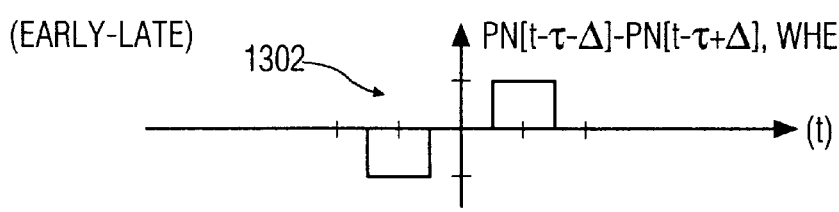
FIG. 13 is a graph of a portion of a second early-late PN signal equal to the second early pseudo-noise signal minus the second late pseudo-noise signal.

FIG. 13 is a graph of a portion of a second early-late PN signal 1302 equal to the second early pseudo-noise signal 1102 minus the second late pseudo-noise signal 1202. The horizontal axis represents time t and the vertical axis represents an amplitude of the second early-late PN signal 702, PN(t−τ̂−Δ)−PN(t−τ̂+Δ), where Δ<$T_C/2$. Adder 418 subtracts the second late PN signal 1202 from the second early PN signal 1102 to produce the second early-late PN signal 1302.

Figure 14:
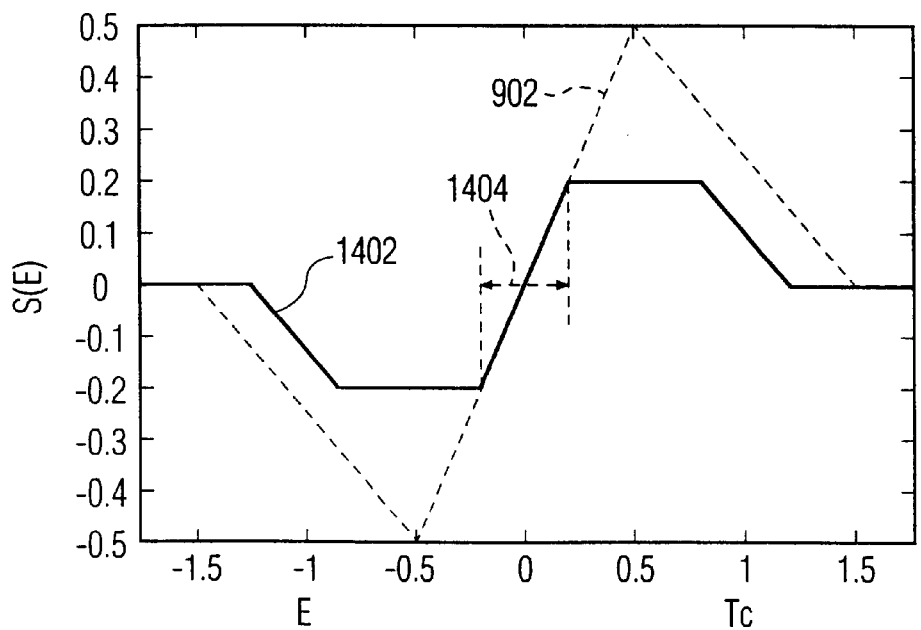
FIG. 14 is a graph of the S-curve tracking range corresponding to the control signal, S($\epsilon$), when $\Delta=T_C/2$ and an S-curve corresponding to the control signal, S($\epsilon$), when $\Delta<T_C/2$.

FIG. 14 is a graph of the S-curve tracking range 902 corresponding to the control signal (dashed line), S(ε), when Δ=$T_C/2$ and an S-curve 1402 corresponding to a control signal, S(ε), when Δ<$T_C$/2 (solid line). The S-curve 1402 is defined by Equation (4), where ε is the tracking error. The S-curve characteristics and the DLL's performance are a function of a time difference between the delayed and advanced PN codes. As seen from FIG. 14, the S-curve 1402 is also a non-linear function of the tracking error; however, the DLLs 208 and 402 are designed to operate in a linear region 1404 of the S-curve 1402, about S(ε)=0. The DLL circuitry within the DLLs 208 and 402 still attempt to drive the output of the S-curve to zero. When S(ε)=0 the DLLs 208 and 402 are said to be in lock.

Comparing the S-curve 902 when Δ=$T_C$/2 with the S-curve 1402 when Δ<$T_C$/2, the following differences are observed. When Δ<$T_C$/2, the control signal S(ε) varies over a narrower range than when Δ=$T_C$/2. This has a practical effect of reducing the amplitude of the control signal S(ε) in Equation (4), thus requiring a more sensitive VCO 310 or NCO 414. Also, the linear range 1404 of the control signal S(ε) for S-curve 1402 is narrower than the linear range 904 for S-curve 902. This results in more stable DLLs 208 and 402 (i.e., "jitter" is reduced), and more reliable and continuous DLL lock-ons. Jitter is reduced since, as Δ is made smaller, the OCN and MAI noise effects are significantly decreased. In fact, all correlated-noise effects are reduced. This noise reduction is particularly significant for IS-95 Standard communication systems, where correlated-noise predominates. However, the tracking range of the error signal can not be reduced below a minimum range dictated by factors such as a tolerable noise level, doppler rate and other CDMA performance criteria known in the art.

Figure 15:
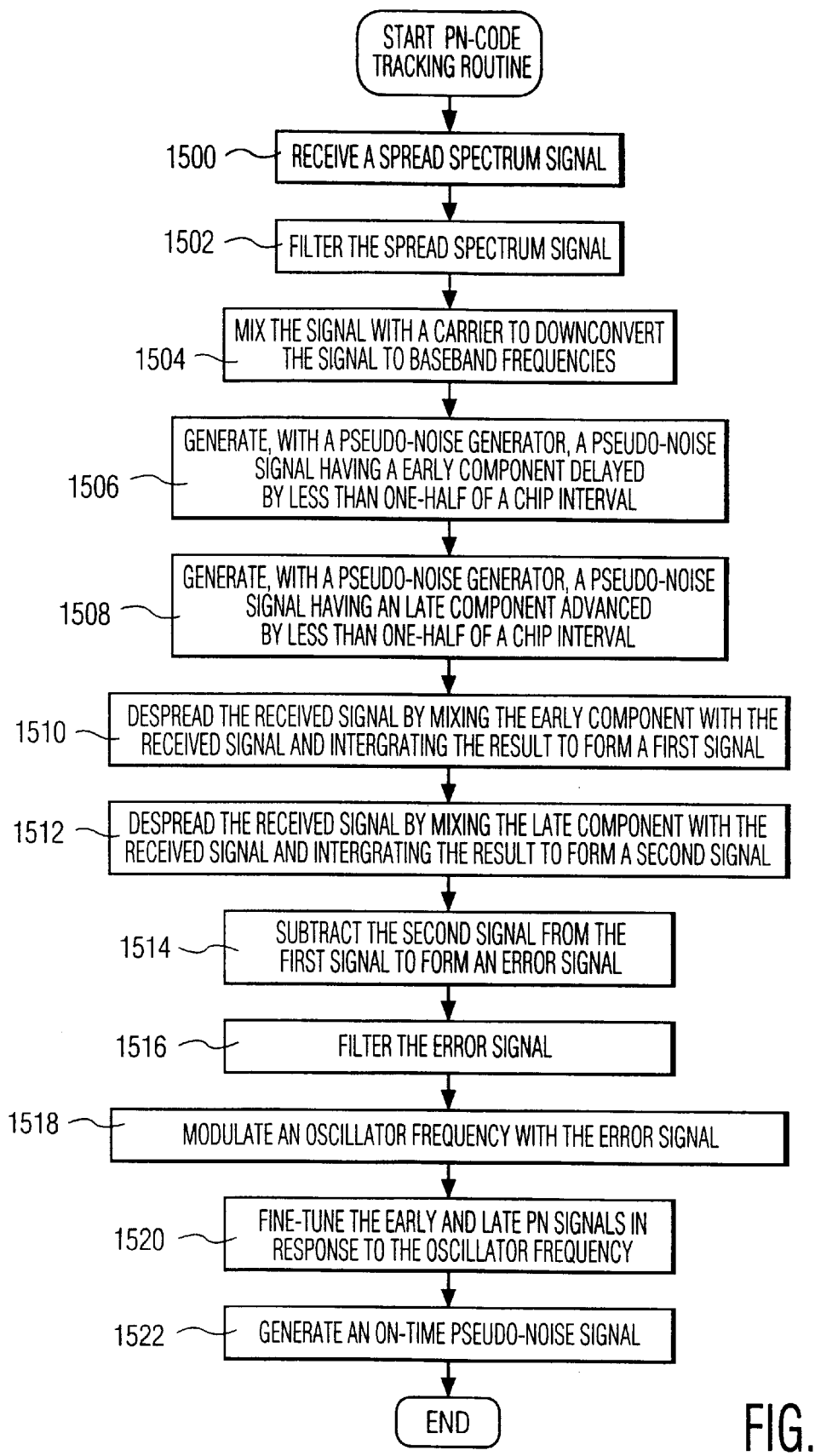
FIG. 15 is a flowchart of a method for locking onto a pseudo-noise code in an IS-95 spread spectrum communications system.

FIG. 15 is a flowchart of a method for locking onto a pseudo-noise code in an IS-95 spread spectrum communications system. The method begins in step 1500 where the antenna 202 receives a spread spectrum signal. Next, in step 1502, the band pass filter 204 filters the spread spectrum signal. In step 1504, mixer 206 mixes the signal with a carrier to downconvert the signal to baseband frequencies. In step 1506, the PN generator 312 generates a PN signal having an early component delayed by less than one-half of a chip interval. Next in step 1508, the PN generator 312 generates a PN signal having a late component advanced by less than one-half of a chip interval. In step 1510, mixer 314 mixes the early component with the received signal and integrator 316 integrates the result over a predetermined number of symbols to form a first signal. The number of symbols is dependent upon a variety of factors such as tolerable noise levels, doppler rates, as well as other performance criteria known in the art. In step 1512, mixer 318 mixes the late component with the received signal and integrator 320 integrates the result over the predetermined number of symbols to form a second signal. Next, in step 1514, adder 306 subtracts the second signal from the first signal to form the error signal. In step 1516, the loop filter 308 filters the error signal. In step 1518, the VCO 310 oscillator frequency is modulated by the error signal. Next in step 1520, the PN generator 312 iteratively fine-tunes the early and late PN signals in response to the modulated oscillator frequency. In step 1522 the PN generator 312 generates an on-time PN signal for use by the deinterleave and decode device 210.

Figure 16:
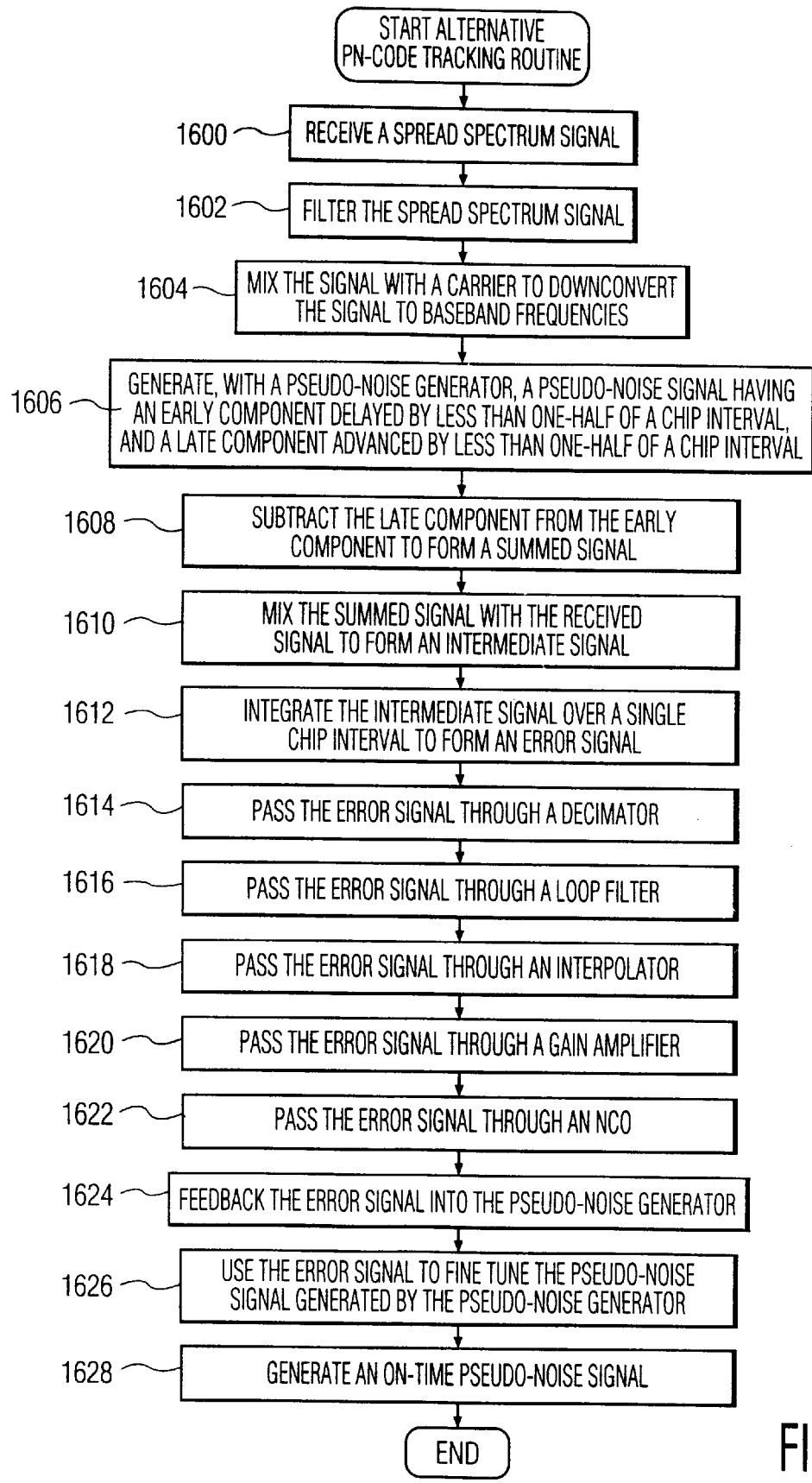
FIG. 16 is a flowchart of an alternate method for code tracking in an IS-95 spread spectrum communications system.

FIG. 16 is a flowchart of an alternate method for code tracking in an IS-95 spread spectrum communications system. The alternate method begins in step 1600 where the antenna 202 receives a spread spectrum signal. Next, in step 1602, the band pass filter 204 filters the spread spectrum signal. In step 1604, the mixer 206 mixes the signal with a carrier to downconvert the signal to baseband frequencies. In step 1606, the pseudo-noise generator 416 generates a pseudo-noise signal having an early component and a late component. Next in step 1608, adder 418 subtracts the early component from the late components to form a summed signal. In step 1610, mixer 420 mixes the summed signal with the received signal to form an intermediate signal. In step 1612, integrator 422 integrates the intermediate signal over the predetermined number of symbols to form an error signal. In step 1614, the error signal is passed through decimator 406. In step 1616, the error signal is passed through loop filter 408. In step 1618, the error signal is passed through interpolator 410. In step 1620, the error signal is passed through gain amplifier 412. In step 1622, the error signal is passed through NCO 414. Next in step 1624, the PN generator 416 receives the error signal from NCO 414, thus completing the feedback loop/delay-locked loop. In step 1626, the PN generator 416 uses the error signal to fine tune the early and late components of the PN code signal. In step 1628, the PN generator 416 outputs an on-time PN code signal for use by the deinterleave & decode device 210 to demodulate and decode baseband signals from the received spread spectrum signal.

While the present invention has been described with reference to a preferred embodiment, those skilled in the art will recognize that various modifications may be made. Variations and modifications to the preferred embodiment are intended to be within the scope of the present invention, which is limited only by the following claims.

What is claimed is:

1. An apparatus for locking onto a received pseudo-noise code, the apparatus comprising:

a pseudo-noise generator, coupled to receive a timing adjust signal and in response generate an early pseudo-noise signal delayed by less than one-half of a chip interval relative to an on-time pseudo-noise signal, and a late pseudo-noise signal advanced by less than one-half of a chip interval relative to the on-time pseudo-noise signal;

an adder for subtracting the late from the early pseudo noise signal to generate a difference signal, a correlator, coupled to the adder for receiving the difference signal and a received spread spectrum signal, and for multiplying the received spread spectrum signal with the difference signal to generate a resulting product signal, an integrator to integrate the resulting product signal, a decimator for decimating the integrated resulting product signal, a loop filter to shape the decimated, integrated product signal, and an interpolator for interpolating the shaped, decimated and integrated product signal, and a numerical controlled oscillator for receiving the interpolated, shaped, decimated and integrated product signal and generating said timing adjust signal, wherein a loop is created in which the received spread spectrum signal tracks the pseudo-noise code.

2. The apparatus of claim 1 wherein the pseudo-noise generator delays the early pseudo-noise signal by one-quarter of a chip interval.

3. The apparatus of claim 1 wherein the pseudo-noise generator advances the late pseudo-noise signal by one-quarter of a chip interval.

* * * * *